United States Patent [19]

Mims

[11] 4,034,370

[45] July 5, 1977

[54] SECOND ORDER MOTION COMPENSATOR FOR HIGH RESOLUTION RADAR

[75] Inventor: James H. Mims, Linthicum, Md.

[73] Assignee: Westinghouse Electric Corporation, Pittsburgh, Pa.

[22] Filed: Apr. 6, 1976

[21] Appl. No.: 674,181

Related U.S. Application Data

[63] Continuation of Ser. No. 283,263, Aug. 23, 1972, abandoned.

[52] U.S. Cl. .......................... 343/5 CM; 343/5 DP
[51] Int. Cl.² .......................................... G01S 9/02
[58] Field of Search ...................... 343/5 CM, 5 DP

[56] References Cited

UNITED STATES PATENTS

| | | | |
|---|---|---|---|
| 3,737,900 | 6/1973 | Vehrs, Jr. | 343/5 CM X |
| 3,768,096 | 10/1973 | Dentino | 343/5 CM X |
| 3,798,425 | 3/1974 | Heard et al. | 343/5 DP X |

Primary Examiner—T.H. Tubbesing
Attorney, Agent, or Firm—H. W. Patterson

[57] ABSTRACT

A method and apparatus for providing motion compensation that allows dynamically changing flight paths during high resolution, squinted, synthetic aperture mapping by making use of a second order motion compensation by means of a two-stage correlator configuration utilizing digital signal processing techniques.

12 Claims, 11 Drawing Figures

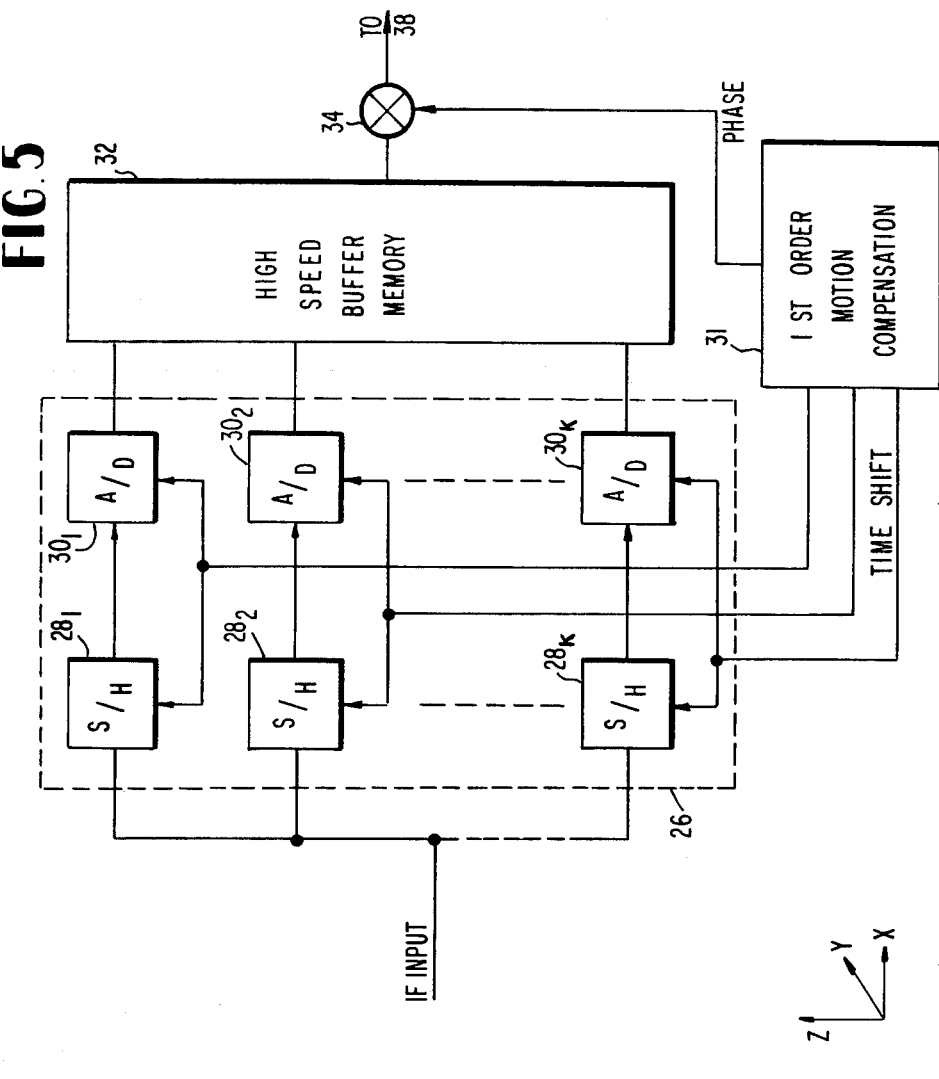
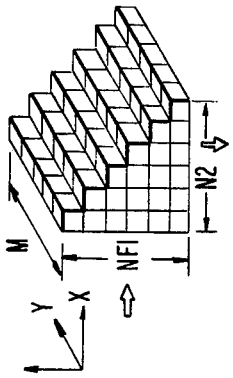
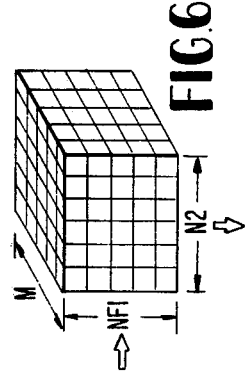
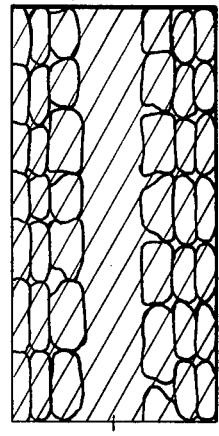
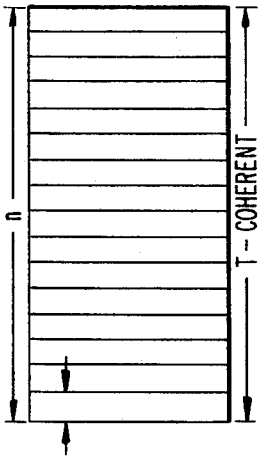
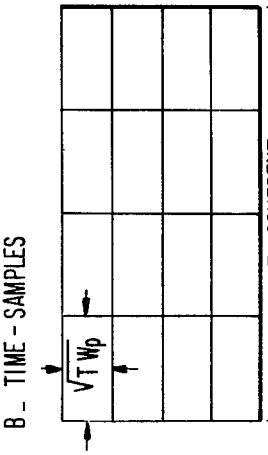

SECOND ORDER MOTION COMPENSATOR FOR HIGH RESOLUTION RADAR

This is a continuation of application Ser. No. 283,263, filed Aug. 23, 1972, now abandoned.

BACKGROUND OF THE INVENTION

1. Field of the Invention

This invention relates generally to high resolution radar systems including apparatus for generating a synthetic antenna and more particularly to a method and means for providing in-flight, high resolution radar mapping under conditions of relaxed aircraft maneuvers.

2. Description of the Prior Art

In present day side-look synthetic aperture radars which are utilized for high resolution radar mapping, such systems are generally constrained to straight and level flight paths, or at most very limited maneuvers during the mapping run. Such flight courses, however, are hazardous in a hostile environment and conversion maneuvers for ground strike are limited. An extremely narrow flight corridor is thus required for very high resolution mapping even when a well known first order motion compensation procedure is applied. Such a teaching is found in *Synthetic Aperture Radar Systems*, R.O. Harger, Academic Press, 1970, pages 146–155, inclusive.

Generally, such first order motion compensation methods adjust the phase of received radar return signals so as to cancel the phase shift caused by small flight paths deviations from a straight line thus generating a uniform holographic signal format which is required for optical correlation. This type of motion compensation however is basically incompatible with the dynamically changing geometry associated with a tactical aircraft. Other problems also arise with this method of compensation when high resolution operation is desired under high aircraft acceleration. Excessive acceleration along the target line of sight occurs when the range curvature (quadratic component) during a coherent integration period exceeds the design range resolution, i.e. a point target crosses from one range gate to another even though the range gates are accurately tracking the velocity (linear component). An excessive acceleration component perpendicular to the target line of sight but in the aircraft velocity line of sight plane projects intolerable acceleration errors at azimuth angles away from the azimuth boresight even though perfect compensation is applied at all points along the intersection of the azimuth boresight with the ground. Thus it is fundamentally impossible to cancel these errors with a single correction as the complex radar return signal arrives. Uncorrected, these problems cause target decorrelation resulting in an intolerable amount of map smear.

SUMMARY

Briefly, the subject invention comprises a method and apparatus for providing a digital implementation of dynamic motion compensation in an azimuth squinted, synthetic aperture radar (SAR) by providing two stages of digital correlation utilizing discrete Fourier transform or more preferably fast Fourier transform techniques. The data operated upon and controlled by the subject invention is provided by a coherent transmitter-receiver with coherent inphase (I) and quadrature (Q) phase demodulators which provides a digital representation of the return signals. During each interpulse period an analog-to-digital interface samples the I and Q video channels and provides digital representations thereof. First order motion compensation apparatus is coupled to the analog to digital interface to control the A/D sampling intervals such that the average relative target movement at each range gate is tracked during the required observation time and a two way RF phase shift associated with the instantaneous change in line of sight distance to each range gate is applied such that all phase shift rate is cancelled along the locus of the intersection of the azimuth boresight with the assumed ground surface. Thus after the first order motion compensation is applied, the stationary ground targets lined along the azimuth boresight exhibit zero Doppler frequency whereas targets away from the azimuth boresight will exhibit a Doppler frequency which is proportional to the azimuth separation distance.

The first order compensated digital data samples are then stored in a high speed buffer memory in real time and delivered or fed out at a lower rate making use of the full interpulse period of the radar in order to minimize subsequent digital calculation rates. A first integrating digital filter bank configured as a discrete Fourier transform (DFT) data processor preferably implemented by a fast Fourier transform (FFT) algorithm is coupled to the high speed buffer and provides the integrating function for the first stage of correlation. The targets thus illuminated by the radar antenna pattern in each range gate are separated on a spectral basis in the time domain by the integrating digital filter bank which in effect forms a plurality of synthetically generated subbeams to each of which a unique second time translation and a phase shift is applied. Following this second order motion compensation, a second and final DFT or FFT stage of correlation sequentially operates on each synthetic subbeam which in effect divides each synthetic subbeam into a plurality of high resolution beam responses or azimuth cells representing the final motion compensated azimuth synthetic aperture resolution data which are then applied to suitable SAR display output means.

The function of the second order motion compensation apparatus is thus to correct the second order errors of line of sight distance to targets at azimuth angles other than along the azimuth boresight or more specifically those azimuth angles corresponding to the synthetically generated azimuth subbeams.

BRIEF DESCRIPTION OF THE DRAWINGS

FIGS. 3A–3D are diagrams helpful in understanding the operation of the subject invention;

FIG. 5 is a block diagram of a time multiplex analog-digital converter particularly adapted for use in connection with the subject invention;

FIG. 6 is a diagram helpful in understanding one type of corner turn buffer memory utilized by the subject invention; and FIG. 7 is a diagram illustrative of another type of buffer memory which can be utilized when desirable with the subject invention.

DESCRIPTION OF THE PREFERRED EMBODIMENT

Prior to considering the subject invention in detail, some general considerations with respect to a high resolution radar system such as a synthetic aperture radar (SAR) should be considered. A synthetic aperture radar is primarily a system for forming an image of terrain from a remote location and includes a processing system which generates a set of relatively narrow synthetic beams in relation to the radiated beam.

Figure 1A:
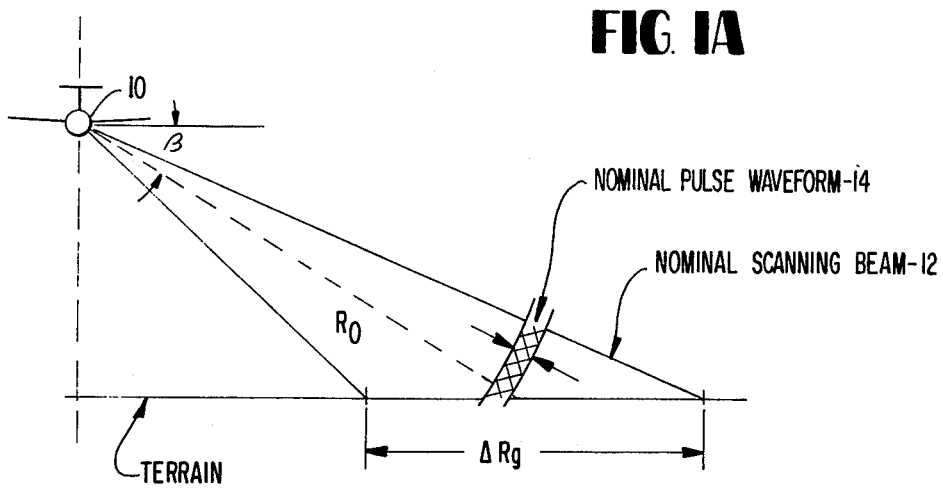
FIGS. 1A and 1B are elevation and plan views respectively of the typical geometry of an airborne synthetic aperture radar system.
Figure 1B:
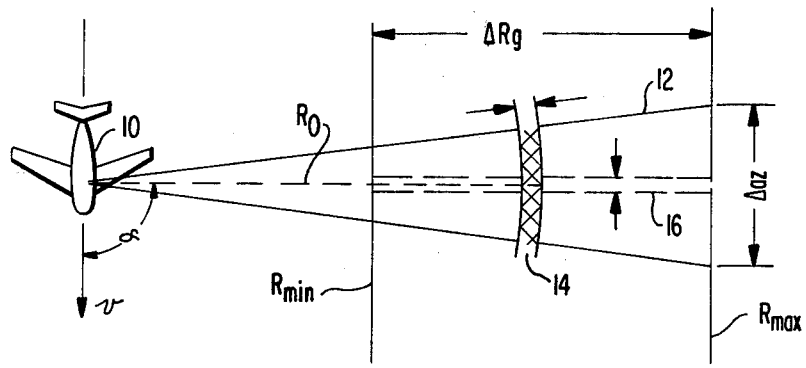

Referring now to the drawings and more particularly to FIGS. 1A and 1B, there is disclosed a typical geometrical implementation of a synthetic aperture radar. The radar platform generally consists of a vehicle such as an aircraft 10 which carries the electronic equipment for radiating a scanning or fixed beam 12 resulting from the transmission of a radar pulse 14 and receiving the reflected radar return signal therefrom. The area of incidence of the transmitted radar pulse 14 comprises a swath in range $\Delta R_g$ and azimuth $\Delta_{az}$ with $\Delta R_g$ having a minimum range $R_{min}$ and a maximum range of $R_{max}$ directed along a radar azimuth boresight $R_O$. The geometry disclosed in FIGS. 1A and 1B further is illustrative of a side look radar wherein the radar beam is directed at a predetermined angle $\alpha$ relative to the direction of flight of the vehicle 10. Scanning in range is accomplished by directing the beam 12 downward along the boresight $R_0$ at an angle $\beta$ with respect to the horizontal. The pulse 14 has a two-way scanning velocity $c/2$ (½ the speed of light) or approximately $1.5 \times 10^8$ m/sec. Scanning in azimuth, on the other hand, is provided by the forward movement of the vehicle 10 and programmed changes in the angle $\alpha$. The scanning velocity $v$ in azimuth is typically 50m/sec. for aircraft.

What is significant about a synthetic aperture radar system is the ability of the processing system to provide a set of effectively narrow subbeams within the illuminating scanning beam, which subbeams are defined as the synthetic beams. A synthetic beam is illustrated in FIG. 1B by reference numeral 16. The synthetic beam is normally accomplished by including a reference frequency generator in the radar receiver which defines the axes of the synthetic antennae. Also provided is an inertial navigation system (INS) which provides a time history of the relative movement of the antenna phase center in some convenient ground coordinate system which is accurate to a small fraction of a radar wavelength for relatively short periods of time, for example, the coherent integration time. The inertial navigation system provides information whereby motion compensation of the vehicle is provided. In the present invention, a first and second order motion compensation is provided which in effect causes the synthetic beams to remain at fixed ground positions during the coherent integration time irrespective of aircraft maneuvers.

More particularly, there is provided a means for transmitting energy pulses of a selected frequency and receiving reflections of the transmitted pulse having a frequency shifted by the target Doppler frequency. The reflective pulses are coherently demodulated in both in-phase and quadrature channels (complex analog video) by comparison with a transmitted frequency signal to generate the coherent signal of a frequency in accordance with the differences between the reference frequency and the Doppler shifted frequency of the reflected pulses. The remaining Doppler frequency associated with the time history of each range gate has, to a very good approximation for a straight and level flight path, two terms which comprise; (1) a constant frequency term, and (2) a linear FM term. The constant Doppler frequency term is related to the squint angle $\alpha$ shown in FIG. 1 while a linear FM term is related to the fact that a target return exhibits a higher Doppler frequency upon entering than leaving the antenna pattern illumination. Thus if the Doppler frequency components are cancelled by an appropriate correlation signal and the result integrated independently at each range gate, the result will approach zero for all target signals except the target signals from a small area having essentially the same Doppler frequency history as the correlation reference signal. It is this function which defines the relative narrow synthetic beam. Normally a ground based optical correlator performs the equivalent of this function.

With the simultaneous use of a coherent transmitter, a monopulse error detecting system and means for video integration, there is availble for analysis virtually all of the information contained in the radar echo signal such as the time of arrival, direction of arrival, and amplitude and phase, together with the history and rate of change of these quantities. While such a system is particularly useful for accurate high resolution ground mapping, it can when desired by readily adapted to provide a number of auxiliary functions such as Doppler navigation, terrain avoidance, indication for low altitude missions, measurement of slant range to ground, automatic tracking, moving target indication and moving target tracking. For a more detailed discussion of such systems, the reader is directed to the text of *Synthetic Aperture Radar Systems*, R. O. Harger, supra.

Figure 2:
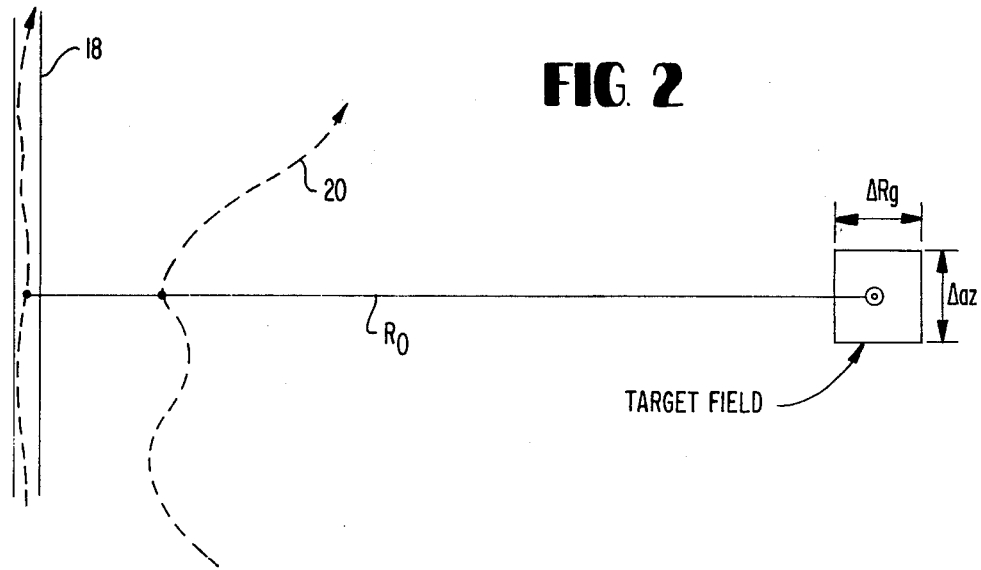
FIG. 2 is an illustrative diagram of a flight path which requires second order motion compensation to prevent map smearing.

Having thus briefly considered the characteristics of a synthetic aperture radar, attention is now directed to FIG. 2, which contrasts the problem confronted with the prior art to the more dynamic tactical requirements that are associated with the present invention. In a high resolution radar, the airborne vehicle of platform upon which the radar is mounted normally must remain within a small straight corridor shown by reference numeral 18 during the coherent integration time of the SAR in order to avoid map smcaring which is the result of decorrelated data processing. The dimensions of the corridor 18 is generally several feet, depending upon the first order motion compensation configuration implemented but in any case is limited to the depth of focus $\Delta R_{foc} \times 2r_a^2/\lambda$ where $r_a$ is the processed range resolution which is a function of the parameters associated with the transmitted pulse and $\lambda$ is the operating wavelength.

Figure 4:
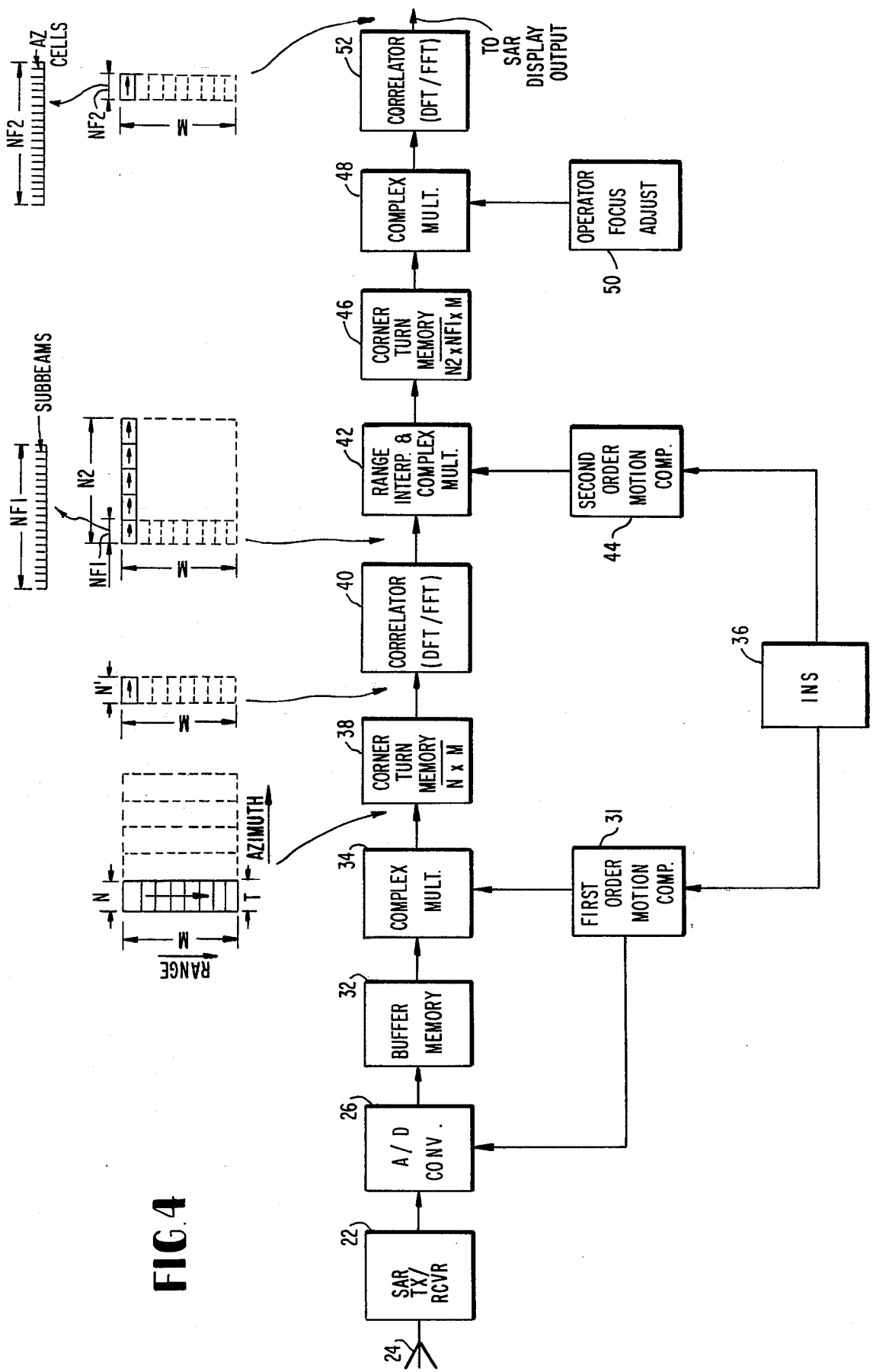
FIG. 4 is a block diagram of the preferred embodiment of the subject invention.

Within the depth of focus corridor 18, a first order motion compensation is normally provided as is well known to those skilled in the art. Assuming that sufficient navigational data is available, the deviation of the actual line of sight target distance compared to the line of sight distance measured from the desired flight path can be computed and used to make first order corrections as the data is collected. The first order motion compensation involves a time translation and a phase shift according to:

$$\tau = 2E_{R(v,r)}/c \qquad (1)$$

$$\phi = 4\pi E_{R(y,x)}/\lambda \qquad (2)$$

Where $E_{R(y,x)}$ is the line of sight deviation as a function of range $y$ and azimuth $x$, $c$ is the speed of light, and $\lambda$ is the wavelength.

Where the digital signal processing of the radar return signals is involved, as it is in the present invention, the time shift is more conveniently accomplished by variation of the digital data sampling times, i.e. the range gate, while the phase shift is more easily applied after the analog to digital conversion where the range rate is relatively lower. This will be shown in greater detail when FIG. 4 is considered.

A second order or "dynamic" motion correction as a function of azimuth angle away from boresight $R_0$ is necessary when operating at very high resolution and the aircraft deviates from the usual flight corridor shown by reference numeral 18 and follows a course such as shown by reference numeral 20 in FIG. 2. Generally, .1G aircraft maneuver constitutes excessive flight path deviation during a coherent processing time for a single look where a plurality of consecutive radar pulses are transmitted during the coherent integration time. This effect is normally very difficult to correct because a different compensation is required for each target or ground point as a function of their instantaneous azimuth position relative to the boresight $R_0$. A graphic illustration of this is shown by the time-frequency diagram at FIG. 3A wherein the diagonal strips denote the respective radar return signals from consecutive transmitted pulses during a squint mode for a predetermined coherent integration time after a first order motion correction has been made. The blobs define boundaries between signal components requiring different compensation as a function of angular beams position and time for a typical range gate. Since zero Doppler corresponds to target position at boresight, it is seen that the Doppler spread increases on either side of zero which is the same as increasing azimuth distances on either side of the boresight. Thus smearing occurs.

Referring now to FIG. 3B, there is disclosed $n$ time segments of raw data resulting from $n$ consecutive transmitted radar pulses occuring during one coherent integration time. Each $1/\Delta fd$ segment represents a signal sample including components of the full Doppler bandwidth, thus making separate compensations as a function of Doppler frequency impossible. Likewise, it is not possible in the azimuth Fourier plane of a conventional optical processor to make proper compensation since different time contributions to a given Doppler cell require separate compensation as shown in FIG. 3D.

The method contemplated by the subject invention is a time-frequency decimation wherein a digital processor generates a suitable signal format compatible for second order motion compensation. An illustrative example of a suitable time-frequency decimation is illustrated in FIG. 3C. Although not essential, $\sqrt{TW_p}$ partitions in time and Doppler spread are chosen wherein T is the coherent integration time and $W_p$ is the Doppler bandwidth processed. $\sqrt{TW_p}$ corresponds to the unfocused resolution which can be expressed as the $\sqrt{R\lambda/2}$. This choice allows $\sqrt{TW_p}$ corrections to be made across the azimuth beamwidth for each of the $\sqrt{TW_p}$ time intervals during the coherent integration time. Such a procedure will now allow for flight deviations associated with several G maneuvers.

Directing attention now to FIG. 4, there is shown in block diagrammatic form, a digital implementation of the preferred embodiment for performing the required second order or dynamic motion compensation discussed above. Reference numeral 22 generally designates a synthetic aperture radar (SAR) transmitter/receiver coupled to a suitable antenna assembly 24. Assuming that N consecutive pulses for each coherent integration time period are transmitted and received, the complex video signals for each radar return is consecutively fed to an analog to digital (A/D) converter 26 which may, when desirable, take the form of a time multiplexer configuration such as shown in FIG. 5. The analog I&Q data of each complex video radar return pulse is converted into M complex digital data samples or range cells during each interpulse period. Referring briefly to FIG. 5, the time multiplexer may include K sample and hold circuits $28_1$, $28_2$ ... $28_K$ which feed into respective analog to digital converter stages $30_1$, $30_2$ ... $30_K$ so as to reduce the data rate for each circuit by a factor of K. The sample and hold as well as the analog to digital converter stages are clocked from a first order motion compensation section 31 which provides the time translation T required for the first order motion correction referred to above and defined by equation (1). The output of the A/D converters $30_1$, $30_2$ ... $30_K$ couple into a high speed buffer memory 32 which then operates to sequentially feed out M complex data samples corresponding to M range cells for each pulse or azimuth time segment. As the M complex data samples are fed out of the buffer memory 32, they are fed to a complex multiplier circuit 34 whereupon each data sample has a phase shift as defined by equation (2) applied thereto which is also required for the first order motion compensation as noted above. The first order motion compensation section 31 is coupled to and receives suitable data from the vehicle inertial navigation system (INS) 36.

Coupled to the complex multiplier circuit 34 is a buffer memory circuit 38 which stores M sets of N complex data samples during each coherent integration time T. The memory 38, which may be for example comprised of a magnetic core matrix of MOS memory perfors a "corner turn" operation wherein the data is entered by columns index, M, and read out by rows, index N. The memory 38, when desirable, may be double buffered so that data being read out does not interfere with data being read in.

A first digital correlator 40 is coupled to the corner turn buffer memory 38 to perform a correlation integration function and as such acts as a digital filter bank. The correlator 40 comprises Discrete Fourier Transform (DFT) apparatus preferably configured to perform the Fast Fourier Transform algorithm. Such apparatus generally accepts $N'$ time samples and delivers NF1 equally spaced frequency band samples where for the present application NF1 = $\sqrt{TW_p}$ as illustrated by the diagrams 3B and 3D. A practical application which provides adequate sampling rate and upper bounds on the stop band response of the digital filter bank requires that more than NF1 time samples, i.e. $N' \geq 2NF1$ be integrated by the first correlator stage 40 and that successive transformations of the $N'$ data blocks at each range gate M be overlapped by 50–75%. One type of apparatus which can be utilized for the subject invention is disclosed for example in U.S. Pat.

application Ser. No. 269,362, filed in the name of the present inventor on July 6, 1972 and entitled "Dual Block Fast Fourier Transform Apparatus" which is a continuation of U.S. patent application Ser. No. 151,441, filed June 9, 1971, both applications now being abandoned.

Thus a first correlation filter bank 40 in the form of a N' point DFT or FFT processor is coupled to the buffer 38 whereupon a repeated sequence of N' samples are processed M times for each coherent integration time.

The processor 40 effects a time-frequency decimation which in effect resolves the N' samples into NF1 frequency bands which correspond to a plurality of synthetic subbeams in azimuth about the boresight $R_0$. It is convenient to choose N' as a power of 2 such that $N' = 2^k$. The processor 40 then can be regarded as a $k$ stage Fourier transform processor since $k$ similar operations are performed sequentially on the data. The correlator 40 provides an output sequence of M sets of NF1 subbeams for each coherent integration time T. Thus, for example, for N2 integration time periods, up to N2 = NF1 synthetic subbeams would be produced. These subbeam responses comprise time samples which are sequentially fed to a range interpolater and complex multiplier 42 which effects a second order motion compensation time translation $\tau'$ and RF phase shift $\theta'$ respectively to each subbeam time sample. The required time and RF phase shift is determined from data fed to a second order motion compensation section 44 driven by the inertial navigational system 36.

Each of the synthetic subbeams is fed into a second corner turn buffer memory 46 which may be, for example, configured as shown in FIGS. 6 and 7 wherein each block illustrated represents storage means for a complex datum word consisting of several binary bits. Considering first the configuration shown in FIG. 6, the M data sets if subbeams NF1 enter the memory in the direction of the X axis for each of the N2 time periods. Once the memory is full, data is fed out in the direction of the Z axis downward and data blocks comprised of M by N2 samples are fed to a complex multiplier circuit 48 to which an "operator focus adjust" section 50 applies a minor correction when desirable.

The azimuth focus adjustment section 50 applies a quadratic phase shift according to the equation $\phi_n = \frac{1}{2} a (N2 - n + 0.5)^2$ for $n = 1, 2, \ldots N2$ where the operator manually adjusts the focus factor a and the phase shift $\phi_n$ is accomplished by a complex multiplier 48. The output of the complex multiplier 48 is fed to a second digital correlator 52 wherein N2 time samples of each subbeam in NF1 are sequentially applied in M data blocks whereupon NF2 frequency bands or azimuth cells for each subbeam is resolved. The correlator 52 comprises substantially the same apparatus which performs the DFT generally by use of the FFT algorithm as explained with respect to the first correlator 40. The correlator 52 delivers M × NF2 data blocks representing a further subdivision of each of the subbeams NF1 in the azimuth direction and being fully resolved for output to the usual display and/or recorder or synthetic aperture radar mapping apparatus.

Another and more efficient corner turn buffer memory 46 is shown in FIG. 7 which permits continuous operation with half of the memory heretofore required. As each M by NF1 data block is entered from the left side on the x axis, a data block comprised of M by NF2 samples is removed along the z axis as shown and fed to the correlator 50 while all other blocks are shifted to the right and down by one data block.

When desirable, an equivalent motion compensation can be made on the data of each subbeam in the frequency domain by performing a DFT in the range dimension M, multiplying the range coefficient by a linear slope phase shift proportional to the required time phase shift and recovering the time shifted data by an inverse DFT in the range dimension M. Such apparatus, however, requires considerably more circuitry for implementation and therefore is not as efficient as that disclosed with respect to the preferred embodiment of the subject invention shown in FIG. 4.

What has been shown and described, therefore, is a second order or dynamic motion compensator for maneuverablity of an airborne vehicle during high resolution SAR mapping by utilizing a digital processor which is capable of performing the Discrete Fourier Transform and more particularly the Fast Fourier Transform.

Having disclosed what is at present considered to be the preferred embodiment of the subject invention.

I claim:

1. Method of providing motion compensation for target data in a synthetic aperture radar comprising the steps of:
    sequentially transmitting and receiving a plurality of radar pulses during a coherent integration time period, said radar pulses having a predetermined interpulse period and providing analog signals therefrom;
    converting each analog signal into complex digital data samples corresponding to a predetermined number of respective range cells during said coherent integration time period;
    performing a first time correction and phase shift on each of said complex digital data samples thereby effecting a first order motion compensation thereon;
    sequentially entering said complex digital data samples into a memory in sets of digital data time samples for a selected number of interpulse periods;
    sequentially feeding each set of time samples as a data block into a digital correlator and performing a digital integration to resolve said data block into data reflective of a respective plurality of frequency bands which correspond to synthetic subbeams;
    Performing a second time shift and phase correction on each data reflective of each synthetic subbeam thereby effecting a second order motion compensation thereon;
    sequentially feeding data samples for each plurality of synthetic subbeams into a memory in selected sets of range cells;
    feeding out data samples for each synthetic subbeam over a predetermined number of interpulse periods as a data block into another digital correlator and performing a digital integration to resolve each synthetic subbeam into data reflective of a respective plurality of frequency bands which correspond to motion compensated azimuth cells; and
    feeding data reflective of said motion compensated azimuth cells to synthetic aperture radar display apparatus.

2. The method as defined by claim 1 wherein said step performing a digital integration comprises the step of performing a discrete Fourier transform.

3. The method as defined by claim 1 wherein said step of performing a digital integration comprises the step of performing the fast Fourier transform.

4. The method as defined by claim 3 wherein said step performing the fast Fourier transform comprises providing transformations on overlapping data blocks where said overlapping ranges between 50 and 75%.

5. The method as defined by claim 1 wherein said step of performing a digital integration comprises a time frequency decimation process during said coherent integration time.

6. Apparatus for digitally providing motion compensation for vehicle maneuverability in a synthetic aperture radar coupled to the navigational system of said vehicle and including a transmitter and receiver section which respectively transmit and receive a sequence of N radar pulses during a predetermined coherent integration time period and converts the return pulses into a respective number of I&Q analog video signals, the combination comprised of:

means coupled to said receiver section for converting each of said I&Q analog video signals into M complex digital range samples;

first order motion compensation means, coupled to and receiving information from said navigationaly system, connected to said converting means and including means for applying a selective time translation and phase shift to each of said M digital samples;

a first digital data memory coupled to said converting means for storing M data blocks of digital samples where each data block includes time samples covering a selected number of N' of interpulse periods during said coherent integration time;

a digital processor adapter to perform a time-frequency decimation on a digital data block coupled to said memory, being operable to sequentially receive each of said M data blocks and resolve each data block into a plurality of frequency bands which corresponds to NF1 synthetic subbeams;

second order motion compensation means, coupled to and receiving information from said navigational system, connected to said digital processor and including means for applying another selected time translation and phase shift to each frequency band;

a second digital data memory coupled to said second order motion compensation means for storing digital data samples for M × NF1 synthetic subbeams for a selected number N2 time intervals and feed out sequential data blocks of M × N2 into data samples; and a second digital processor adapted to perform a time-frequency decimation process on a data block coupled to said second memory, being operable to sequentially receive each data block therefrom and resolve each said data block into a plurality of frequency bands in the azimuth direction which correspond to motion compensated range cells adaptable for utilization by a synthetic aperture radar display unit.

7. The apparatus as defined by claim 5 wherein said first and second memory comprises a "corner-turn" memory.

8. The apparatus as defined by claim 6 wherein said converting means comprises a time multiplex analog to digital converter.

9. The apparatus as defined by claim 6 wherein the first and second recited digital processor comprises a correlator operable as an integrating digital filter bank.

10. The invention as defined by claim 6 wherein the first and second recited digital processor comprises apparatus implemented to perform the Discrete Fourier Transform algorithm.

11. The apparatus as defined by claim 10 wherein said processors are implemented to perform the Fast Fourier Transform algorithm.

12. The apparatus as defined by claim 7 wherein said second digital memory comprises a triangular memory configuration wherein M × NF1 data blocks are entered on one axis and the N × N2 data blocks is fed out from another axis with means for shifting of data samples progressively from input to output.

* * * * *